(12) United States Patent
Galand (10) Patent No.: US 8,388,282 B2
(45) Date of Patent: Mar. 5, 2013

(54) PROCESSING MACHINE AND ASSOCIATED PROCESSING METHOD

(75) Inventor: Jerome Galand, Ozoir la Ferriere (FR)

(73) Assignee: Cooper Power Tools SAS, Ozoir la Ferriere (FR)

( * ) Notice: Subject to any disclaimer, the term of this patent is extended or adjusted under 35 U.S.C. 154(b) by 831 days.

(21) Appl. No.: 12/561,622

(22) Filed: Sep. 17, 2009

(65) Prior Publication Data

US 2010/0119316 A1    May 13, 2010

(30) Foreign Application Priority Data

Sep. 18, 2008  (FR) ...................................... 08 56292

(51) Int. Cl.
*B23Q 11/10*  (2006.01)

(52) U.S. Cl. ........................... 409/136; 408/57; 409/131

(58) Field of Classification Search .................. 408/1 R, 408/56, 57, 59; 409/131, 135, 136
See application file for complete search history.

(56) References Cited

U.S. PATENT DOCUMENTS

| | | | |
|---|---|---|---|
| 2,453,136 A | 11/1948 | Karweit et al. | |
| 3,487,729 A | 1/1970 | Juhasz et al. | |
| 3,574,290 A | 4/1971 | Eckman | |
| 3,583,822 A | 6/1971 | Alexander et al. | |
| 3,767,313 A | 10/1973 | Bohoroquez et al. | |
| 3,797,583 A | 3/1974 | Quackerbush | |
| 3,838,934 A | 10/1974 | Petroff | |
| 4,083,646 A | 4/1978 | Vindez | |
| 4,111,590 A | 9/1978 | Burkart et al. | |
| 4,443,139 A | 4/1984 | Eash | |
| 4,591,299 A | 5/1986 | Eckman | |
| 4,592,681 A | 6/1986 | Pennison et al. | |
| 4,612,998 A | 9/1986 | Vindez | |
| 4,681,490 A | 7/1987 | Pennison et al. | |
| 4,688,970 A | 8/1987 | Eckman | |
| 4,799,833 A | 1/1989 | Pennison et al. | |
| 4,822,215 A | 4/1989 | Alexander | |
| 4,850,753 A | 7/1989 | Dudden | |
| 4,854,786 A | 8/1989 | Alexander et al. | |
| 5,022,798 A | 6/1991 | Eckman | |

(Continued)

FOREIGN PATENT DOCUMENTS

| | | |
|---|---|---|
| DE | 19 58 412 | 5/1971 |
| DE | 24 36 340 | 3/1975 |

(Continued)

*Primary Examiner* — Daniel Howell
*Assistant Examiner* — Michael Vitale
(74) *Attorney, Agent, or Firm* — King & Spalding LLP (57) ABSTRACT

This processing machine comprises a casing (4), a tool-holder spindle (6) which is to carry a machine tool, a positive feed drive mechanism for the spindle (6), which mechanism is suitable for driving the spindle (6) simultaneously in rotation and in translation relative to the casing (4) in accordance with an advance or return movement, and a system (12) for lubricating the machine tool, comprising a lubricant inlet (40), a lubricant duct (42) delimited by the spindle (6), the lubricant duct (42) opening out at an end of the spindle (6) carrying the machine tool, in order to supply the machine tool (7) with lubricant, and a lubricant-admission module (44) connecting the lubricant inlet (40) to the said lubricant duct (42). The lubricant-admission module (44) forms a lubricant pump drawing in the lubricant from the lubricant inlet (40) and supplying the lubricant duct (42) of the spindle (6), the advance and return of the spindle (6) activating the pumping of lubricant by the admission module (44).

15 Claims, 5 Drawing Sheets

U.S. PATENT DOCUMENTS

| | | |
|---|---|---|
| 5,143,161 A | 9/1992 | Vindez |
| 5,149,232 A | 9/1992 | Eckman |
| 5,351,797 A | 10/1994 | Lawson et al. |
| 5,782,586 A * | 7/1998 | Geissler .................. 408/56 |
| 6,193,447 B1 | 2/2001 | Thames et al. |
| 6,196,772 B1 | 3/2001 | Thames et al. |
| 6,261,033 B1 | 7/2001 | Thames et al. |
| 2006/0018724 A1 | 1/2006 | Oehninger et al. |
| 2007/0154274 A1* | 7/2007 | Petrescu .................. 409/233 |
| 2008/0260485 A1 | 10/2008 | Jaillon |
| 2009/0022555 A1 | 1/2009 | Oehninger et al. |
| 2009/0074525 A1 | 3/2009 | Jaillon |
| 2009/0245955 A1 | 10/2009 | Maillard |

FOREIGN PATENT DOCUMENTS

| | | |
|---|---|---|
| DE | 37 42 725 | 7/1989 |
| DE | 29919604 U1 * | 1/2000 |
| EP | 1550780 | 1/2005 |
| EP | 1958718 A1 * | 8/2008 |
| FR | 2 829 952 | 3/2003 |

* cited by examiner

PROCESSING MACHINE AND ASSOCIATED PROCESSING METHOD

RELATED APPLICATIONS

This patent application claims priority under 35 U.S.C. §119 to French Patent Application No. 08 56292 filed Sep. 18, 2008.

FIELD OF THE INVENTION

The present invention relates to a processing machine having a machine tool and a lubricating system. Such a processing machine is applicable, for example, to aircraft construction.

BACKGROUND

Such a processing machine is known, for example, from FR-A-2 873 315.

This processing machine is of the type comprising:
a casing;
a tool-holder spindle which extends along an axis and which is to carry a machine tool;
a positive feed drive mechanism for the tool-holder spindle, which mechanism is suitable for driving the spindle simultaneously in rotation about its axis relative to the casing and in translation along its axis relative to the casing in accordance with an advance or return movement; and
a system for lubricating the machine tool, comprising:
a lubricant inlet;
a lubricant duct delimited by the spindle, the lubricant duct opening out at an end of the spindle which is to carry the machine tool, in order to supply the machine tool with lubricant; and
a lubricant-admission module connecting the lubricant inlet to the said lubricant duct.

The drive mechanism of such a machine is referred to as "à avance mécanique" in French or as "having positive feed" in English.

Thanks to a lubricant reservoir and a pump which are located outside the casing, the lubricating system ensures the supply of lubricant to the machine tool carried by the spindle.

Nevertheless, the lubricating system has a large space requirement.

SUMMARY

An object of the invention is to provide a processing machine, the lubricating system of which has a reduced space requirement.

To that end, the invention relates to a processing machine of the above-mentioned type, characterized in that the lubricant-admission module forms a lubricant pump drawing in the lubricant from the lubricant inlet and supplying the lubricant duct of the spindle with the drawn-in lubricant, the advance and return of the spindle along its axis activating the pumping of lubricant by the admission module.

According to particular embodiments, the processing machine according to the invention comprises one or more of the following features, taken in isolation or in accordance with any technically possible combination:
the admission module has a configuration for supplying lubricant to the lubricant duct of the spindle and a configuration for the induction of lubricant from the lubricant inlet, the advance of the spindle activating the admission module in the supply configuration and the return of the spindle activating the admission module in the induction configuration;
the configuration for the induction of lubricant by the admission module corresponds to a configuration for stopping the supply by the admission module to the lubricant duct of the spindle;
the admission module comprises a piston and a cylinder which together define a pumping chamber, the pumping chamber being connected to the lubricant inlet and to the lubricant duct of the spindle, the spindle being connected for translation along its axis to one of the piston and the cylinder, the advance and the return of the spindle along its axis modifying the volume of the pumping chamber;
the other of the piston and the cylinder is fixed in terms of translation relative to the casing along the axis of the spindle;
the spindle is connected for translation along its axis to the cylinder;
the piston delimits a filling duct connected to the lubricant inlet and leading into the pumping chamber, the piston delimiting a supply duct leading into the pumping chamber and connected to the lubricant duct of the spindle, the piston comprising a filling valve which is mobile between a position of closing the filling duct and a position of opening the filling duct, and a supply valve which is mobile between a position of closing the supply duct and a position of opening the supply duct;
in the induction configuration, the filling valve is in its opening position while the supply valve is in its closing position and, in the supply configuration, the filling valve is in its closing position while the supply valve is in its opening position;
the filling valve and the supply valve are urged resiliently towards their closing position by a respective resilient biasing member;
the force exerted on the filling valve by the resilient biasing member is smaller than the suction force exerted on the filling valve by the lubricant present in the pumping chamber, during the return of the spindle along its axis;
the force exerted on the supply valve by the resilient biasing member is smaller than the pressing force exerted on the supply valve by the lubricant present in the pumping chamber, during the advance of the spindle along its axis;
the admission module is accommodated in the casing;
the processing machine comprises a lubricant reservoir connected to the lubricant inlet and preferably located outside the casing of the machine; and
the mechanism for driving the spindle comprises:
a first member for driving the spindle in rotation about its axis relative to the casing;
a second member for driving the spindle in translation along its axis relative to the casing, the second drive member being screwed onto a threaded portion of the spindle so that the spindle advances or returns in accordance with the relative rate of rotation between the first drive member and the second drive member.

The invention relates also to a method for processing a material by means of a processing machine carrying a machine tool, the method comprising a step for the automatic lubrication of the machine tool by the processing machine, characterized in that the processing machine is as defined above, the lubricating step comprising a step of pumping lubricant by the alternating advance and return movement of the spindle.

BRIEF DESCRIPTION OF THE DRAWINGS

The invention will be better understood on reading the following description which is provided purely by way of example and which is given with reference to the appended drawings, in which.

DETAILED DESCRIPTION OF THE EXEMPLARY EMBODIMENT

Figure 1:
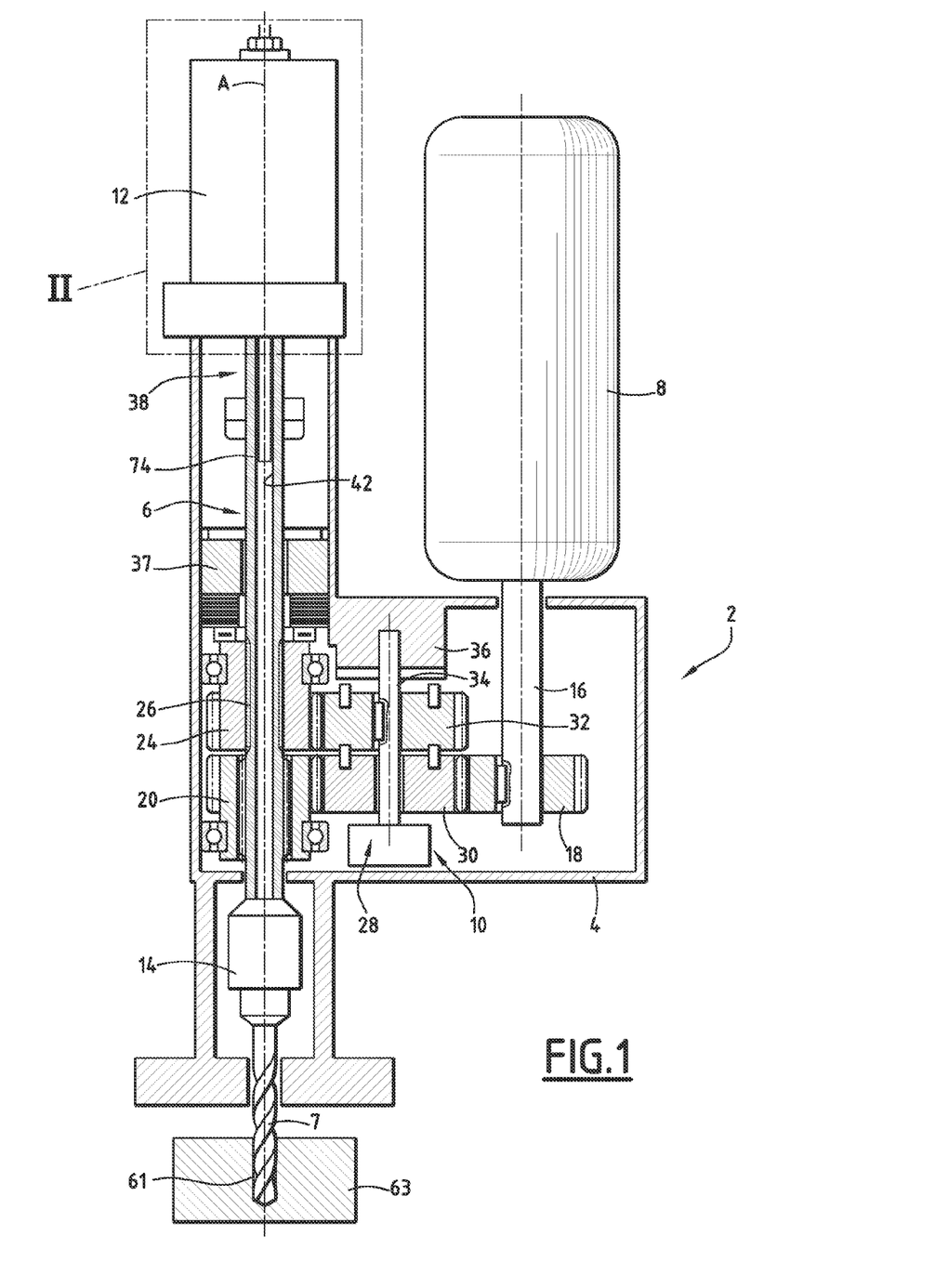
FIG. 1 is a diagrammatic view in lateral section of a processing machine according to the invention.

Throughout the following, the terms "right", "left", "vertical", "horizontal", "lower", "upper", "top" and "bottom" are to be understood relative to the position of the machine in FIG. 1.

FIG. 1 illustrates diagrammatically a portable processing machine 2 which comprises principally:

- a casing 4;
- a tool-holder spindle 6 extending along a vertical axis A and carrying a drilling tool 7;
- a motor 8, for example a pneumatic motor;
- a mechanism 10 which drives the spindle 6 and which connects the motor 8 and the spindle 6 mechanically; and
- a system 12 for lubricating the tool 7.

The spindle 6 is received in the casing 4 in such a manner that it is mobile in terms of rotation about its axis A and in terms of translation along that axis A.

The drilling tool 7 is, for example, a drill bit mounted removably at the lower end 14 of the spindle 6.

The output shaft 16 of the motor 8 carries an output gear wheel 18 which meshes with the drive mechanism 10.

As illustrated by FIG. 1, the drive mechanism 10 comprises the following elements, so that it constitutes a mechanism referred to as "à avance mécanique" in French or as "having positive feed" in English:

- a first gear wheel 20 for driving the spindle 6 in rotation about its axis A relative to the casing 4;
- a second gear wheel 24 for driving the spindle 6 in translation along its axis A relative to the casing 4, the second gear wheel 24 for driving in translation being screwed onto a threaded portion 26 of the spindle 6, so that the spindle 6 advances or returns along the axis A in accordance with the relative rate of rotation between the drive gear wheels 20 and 24.

The drive mechanism 10 comprises an engaging system 28 connecting the first drive gear wheel 20 and the motor 8 mechanically for rotation, and disengaging or engaging the second drive gear wheel 24 from or with the motor 8.

The engaging system 28 has a configuration for advancing the spindle 6, in which configuration the second drive gear wheel 24 is engaged with the motor 8, and a configuration for returning the spindle 6, in which configuration the second drive gear wheel 24 is disengaged from the motor 8 and immobilized in terms of rotation relative to the casing 4.

In the advance configuration, the second drive gear wheel 24 and the first drive gear wheel 20 are connected mechanically for rotation to each other and to the motor 8. The second drive gear wheel 24 is driven in rotation at a rate higher than the first drive gear wheel 20 in order to drive the spindle 6 in translation in accordance with an advance movement along the axis A, that is to say, towards the bottom in FIG. 1.

The illustrated engaging system 28 comprises more precisely a first gear wheel/positive clutch 30 meshing with the first drive gear wheel 20 and with the output gear wheel 18, and a second gear wheel/positive clutch 32 surmounting the first gear wheel/positive clutch 30 and meshing with the second drive gear wheel 24.

The second gear wheel/positive clutch 32 is slipped onto a slide 34 to which it is fixed for translation. The second gear wheel/positive clutch 32 is thus mobile with the slide 34 between a lowered position (FIG. 1) in which the second gear wheel/positive clutch 32 is form-fitted to the first gear wheel/positive clutch 30, corresponding to the advance configuration of the engaging system 28, and a raised position in which the second gear wheel/positive clutch 32 is form-fitted to a fixed positive clutch 36 formed by the casing 4, and in which the second drive gear wheel 24 is thus immobilized in terms of rotation about the axis A of the spindle 6, this corresponding to the return configuration of the engaging system 28.

The drive mechanism 10 comprises an axial bearing mechanism 37 which, during the drilling operation, holds the second drive gear wheel 24 in its lowered position shown in FIG. 1, and which cushions the limit of travel of the spindle 6. For, at the limit of travel, the spindle 6 is locked in terms of translation relative to the casing 4 and displaces the second drive gear wheel 24 towards the top along the axis A, owing to the rotation of the spindle 6 and its helical connection to the second drive gear wheel 24. This displacement of the second drive gear wheel 24 is limited and cushioned by the axial bearing mechanism 37.

The lubricating system 12 will now be described in more detail with reference to FIG. 2.

This lubricating system 12 is located at the upper end 38 of the spindle 6, opposite the lower end 14 carrying the tool 7.

The lubricating system 12 comprises a lubricant inlet 40, an internal lubricant duct 42 delimited by the spindle 6, and a lubricant-admission module 44 connecting the lubricant inlet 40 to the lubricant duct 42 of the spindle 6.

The lubricant inlet 40 is formed by a through-orifice of the casing 4 connected by an external duct 45 to a lubricant reservoir 46 located outside the casing 4. A seal 47 is mounted in the inlet 40.

The internal duct 42 has an axis A. It extends through the spindle 6 from one end to the other along the axis A and leads into the drilling tool 7. The duct 42 thus connects the lubricant-admission module 44 and the drilling tool 7.

The admission module 44 comprises a piston 48, which is fixed in terms of translation along the axis A relative to the casing 4, and a cylinder 49 receiving the piston 48.

The cylinder 49 is fixedly joined to the spindle 6 in terms of translation along the axis A. It is also fixedly joined to the spindle 6 in terms of rotation about the axis A. The cylinder 49 has the axis A.

The cylinder 49 is, in the example illustrated, integral with the spindle 6 and extends the spindle 6 along the axis A.

The piston 48 comprises a rod 50 and a head 51 forming a piston.

The rod 50 is received in a through, sealed and sliding manner in a bore 52 formed at the upper end of the cylinder 49. An annular seal is provided in the bore 52.

The head 51 is received in such a manner that it is sealed and slides along the axis A, in the cylinder 49, which itself has the axis A. Two annular seals ensure that this connection is sealed.

The piston 48 is mounted in a solely rotary manner relative to the casing 4, about the axis A. To that end, the piston 48 is carried by roller bearings. The piston 48 is thus fixed in terms of translation relative to the casing 4. Furthermore, the piston 48 and the cylinder 49 are fixedly joined to each other in terms of rotation about the axis A.

The piston 48 and the cylinder 49 together define a pumping chamber 53. The pumping chamber 53 extends in the annular space defined between the rod 50 and the cylinder 49. The pumping chamber 53 is permanently completely filled with lubricant.

During the advance of the spindle 6, the cylinder 49 slides relative to the piston 48 while decreasing the volume of the chamber 53, which corresponds to a configuration for supplying lubricant to the lubricant duct 42, in which configuration the admission module 44 supplies the duct 42 with lubricant from the lubricant drawn beforehand into the pumping chamber 53.

During the return of the spindle 6, the cylinder 49 slides relative to the piston 48 while increasing the volume of the chamber 53, which corresponds to a configuration for the induction of lubricant from the lubricant inlet 40, in which configuration the admission module 44 draws the lubricant into the pumping chamber 53.

The induction configuration also corresponds to a configuration for stopping supply, in which the supplying of the lubricant duct 42 by the admission module 44 is stopped.

The piston 48 also delimits internally a filling duct 54 connected to the lubricant inlet 40 and leading into the pumping chamber 53, and also a supply duct 56 leading into the pumping chamber 53 and connected to the duct 42 of the spindle 6.

The piston 48 comprises, inside the filling duct 54, a filling valve 58 which is mobile between a position of opening the filling duct 54 and a position of closing the filling duct 54. The piston 48 comprises, inside the supply duct 56, a supply valve 60 which is mobile between a position of opening the supply duct 56 and a position of closing the supply duct 56.

The opening position of the supply valve 60 corresponds to the configuration for supplying the lubricant duct 42 with lubricant. In the supply configuration, the filling valve 58 is closed.

The opening position of the filling valve 58 corresponds to the configuration for the induction of lubricant from the lubricant inlet 40, and from the reservoir 46. In the induction configuration, the supply valve 60 is closed and the supply of lubricant to the duct 42 is stopped.

In the example illustrated, each valve 58, 60 is formed by a ball which is mobile in translation along the axis A between its closing position and its opening position. The valves 58 and 60 are urged resiliently by a respective spring 62, 64 towards their closing position.

The force exerted by each spring 62, 64 is sufficient to close the corresponding valve 58, 60 when the spindle 6 is stopped.

During the advance of the spindle 6, the force exerted on the supply valve 60 by the spring 64 is smaller than the pressing force exerted on the supply valve 60 by the lubricant present in the pumping chamber 53.

During the return of the spindle 6, the force exerted on the filling valve 58 by the spring 62 is smaller than the suction force exerted on the filling valve 58 by the lubricant present in the pumping chamber 53.

Each of the filling and supply ducts 54, 56 comprises an upstream portion 66, viewed in the direction of circulation of the lubricant towards the tool 7, forming a valve seat 67. The valve 58, 60, when in the closing position, closes off the seat 67 in a substantially sealed manner. Each of the ducts 54, 56 also comprises a downstream portion 68 defining a widened chamber 70 in which the respective valve 58, 60 is accommodated, with its spring 62, 64.

The downstream portion 68 of the filling duct 54 and the upstream portion 66 of the supply duct 56 lead into the pumping chamber 53.

The downstream portion 68 of the supply duct 56 forms a tube 74 penetrating the lubricant duct 42 of the spindle 6 over a length sufficient to ensure a supply to the lubricant duct 42 in all of the positions of the spindle 6 along its axis A.

Finally, the piston 48 comprises a duct 76 for injecting air into the lubricant duct 42 of the spindle 6, in order to form a mist from the lubricant. The air-injection duct 76 extends through the piston 48 from one end to the other along the axis A. It opens out outside the casing 4 in order to be connected to a source of compressed air 77 by way of a rotating flow-regulated pneumatic connector 78, and leads, at the opposite end, into the tube 74.

The operation of the machine 2 according to the invention will now be described, in particular with reference to FIGS. 2 to 5 which illustrate different steps of a processing method carried out by means of the machine 2 according to the invention.

Figure 2:
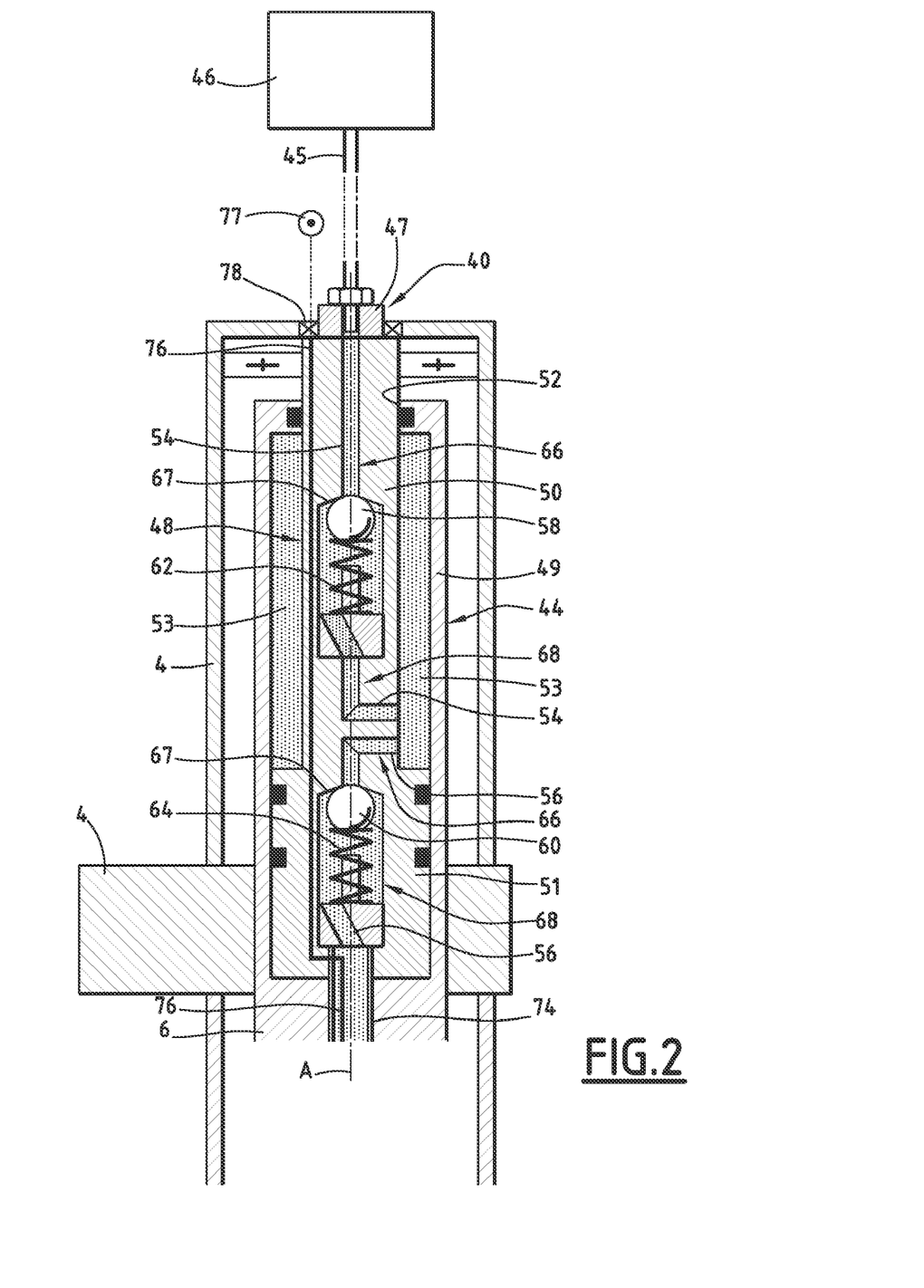
FIG. 2 is an enlarged view of a detail II of FIG. 1 illustrating a lubricating system of the machine of FIG. 1.

In the position of FIG. 2, the spindle 6 has been returned, that is to say, it is at the limit of return travel. The valves 58 and 60 are in their closing position.

Figure 3:
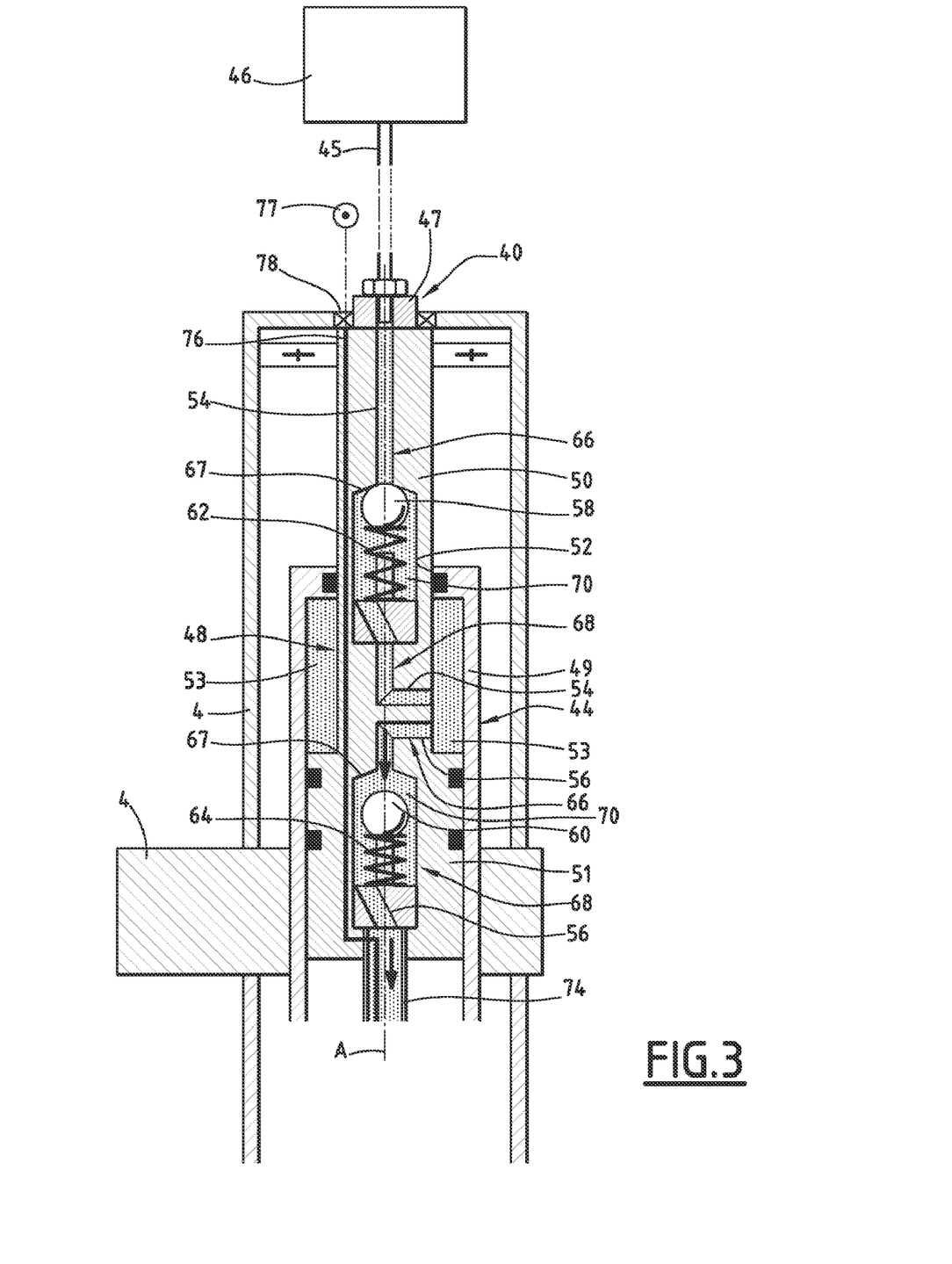
FIG. 3 is a view analogous to FIG. 2 illustrating the lubricating system in a configuration for supplying the machine tool with lubricant, during the advance of the spindle carrying the tool.

During the advance of the spindle 6, illustrated by FIG. 3, the cylinder 49 fixedly joined to the spindle 6 moves together with the latter towards the bottom along the axis A. The piston 48 remains immobile in terms of translation along the axis A. The volume of the pumping chamber 53 then decreases, which generates excess pressure in the downstream portion 68 of the filling duct 54 and in the upstream portion 66 of the supply duct 56.

The excess pressure in the downstream portion 68 of the filling duct 54 keeps the filling valve 58 in its closing position, while the excess pressure in the upstream portion 66 of the supply duct 56 displaces the supply valve 60 towards its opening position. The tube 74 is then supplied with lubricant by the pumping chamber 53, by way of the supply duct 56. The lubricant duct 42 of the spindle 6 and the tool 7 carried at the lower end 14 of the spindle 6 are thus supplied with lubricant.

In addition, during the advance of the spindle 6, the air-injection duct 76 is supplied with compressed air in such a manner as to form a mist from the lubricant present in the lubricant duct 42.

Figure 4:
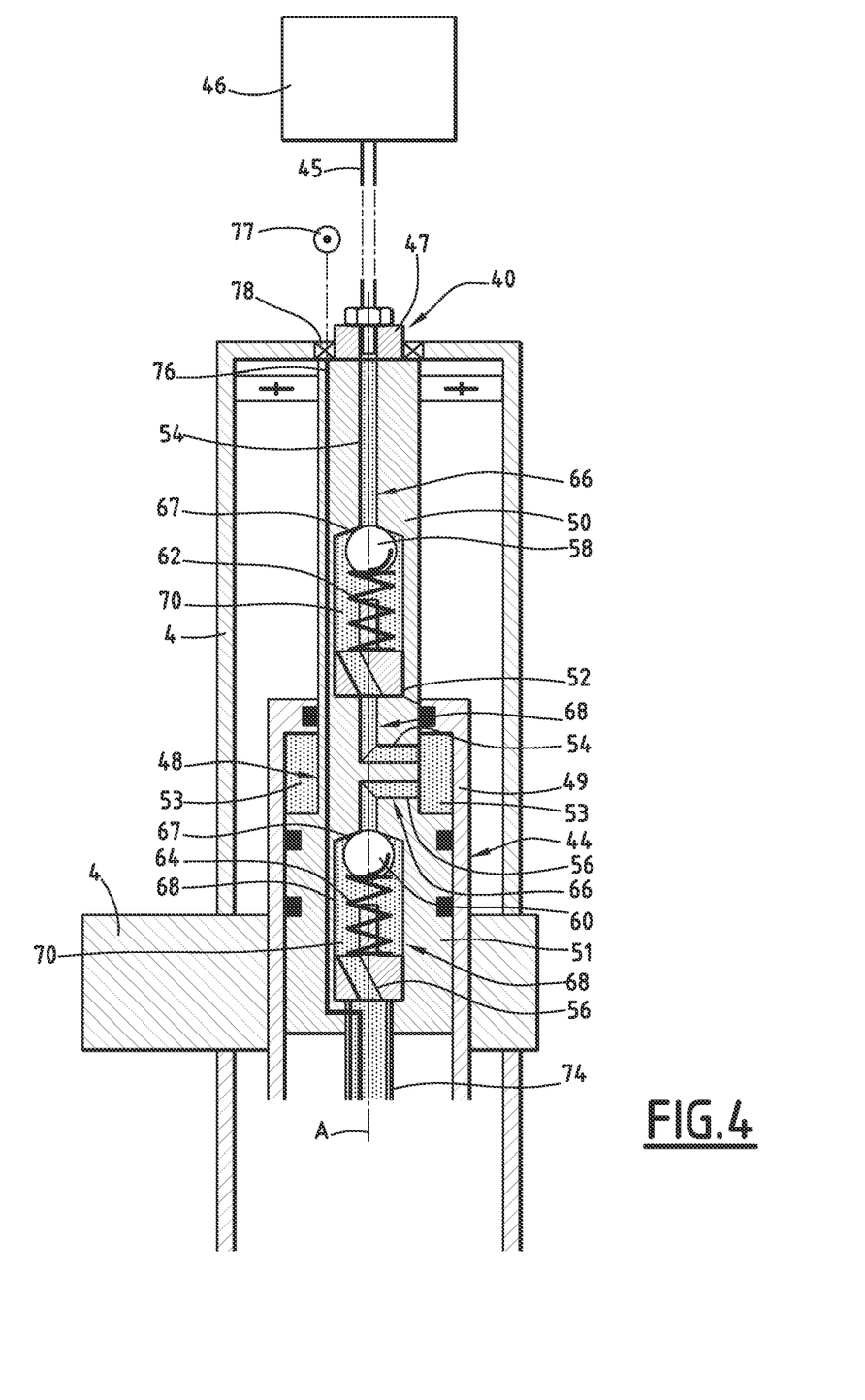
FIG. 4 is a view analogous to FIGS. 2 and 3 at the limit of the advance travel of the spindle.

FIG. 4 illustrates the spindle 6 in its limit of advance travel position in which the supply valve 60 has returned to its closing position, after the stopping of the spindle 6 and the decrease in pressure in the pumping chamber 53 which results therefrom.

Figure 5:
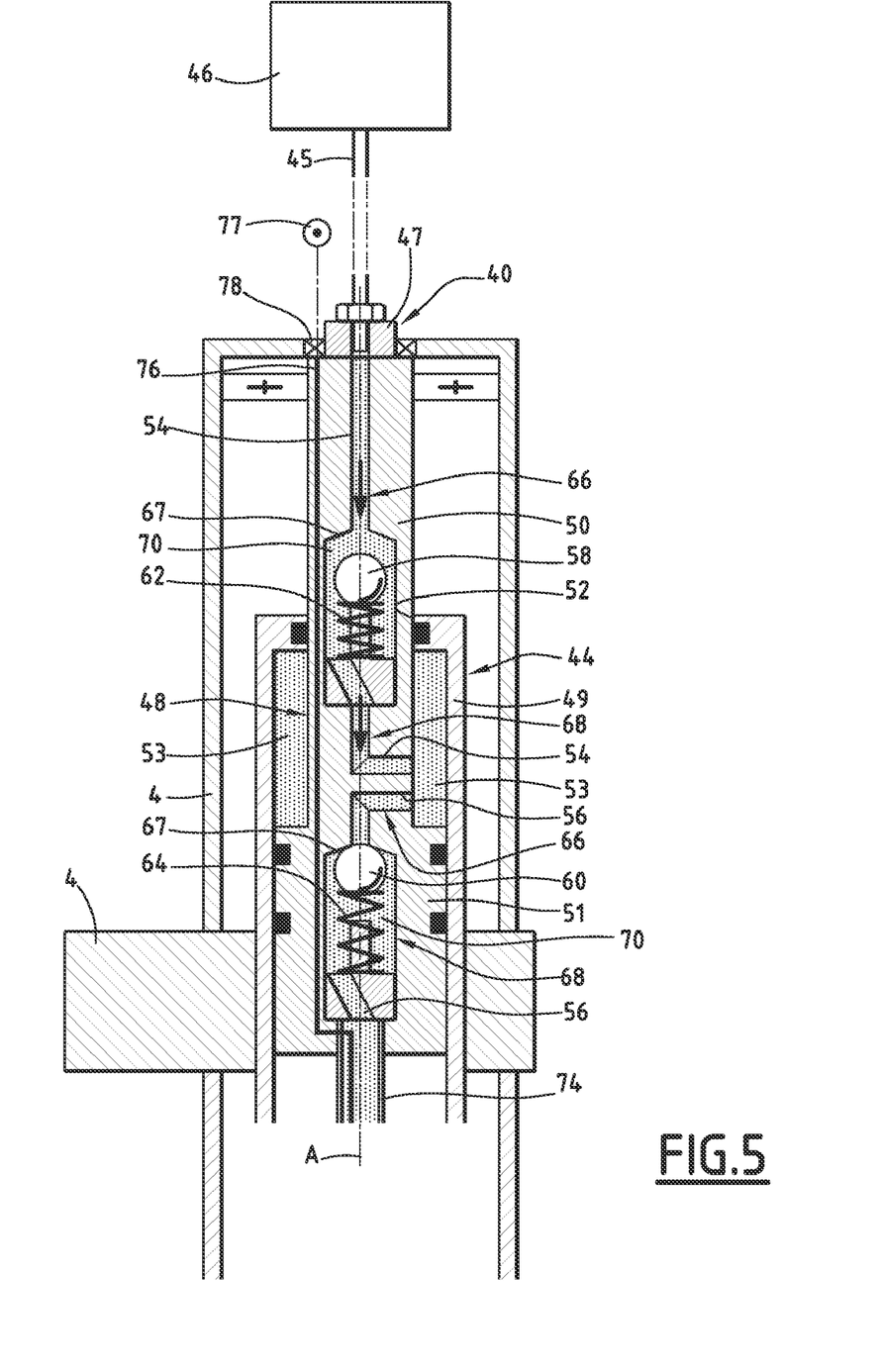
FIG. 5 is a view analogous to FIG. 3 illustrating the lubricating system in a configuration for the induction of lubricant.

During the return of the spindle 6, illustrated by FIG. 5, the cylinder 49 fixedly joined to the spindle 6 moves together with the latter towards the top along the axis A. The piston 48 remains immobile in terms of translation along the axis A. The volume of the pumping chamber 53 then increases, generating a partial vacuum in the downstream portion 68 of the filling duct 54 and in the upstream portion 66 of the supply duct 56.

The partial vacuum in the upstream portion 66 of the supply duct 56 keeps the supply valve 60 in its closing position.

The partial vacuum in the downstream portion 68 of the filling duct 54 displaces the filling valve 58 towards its opening position, counter to the spring 62. This results in the filling of the pumping chamber 53 by the induction of lubricant from the lubricant reservoir 46, by way of the filling duct 54.

Once the return of the spindle 6 has been completed, the difference in pressure between the reservoir 46 and the pumping chamber 53 decreases and the filling valve 58 returns to its closing position. The processing machine 2 is then ready for a fresh advance movement of the spindle 6.

With the invention, it is no longer necessary to provide a pump attached to the outside or the inside of the processing machine 2, the pumping function being provided for by the spindle 6 and its advance and return movement. For, the mechanical energy provided by the advance and return of the spindle 6 is used to pump lubricant, that is to say, to draw in lubricant from the inlet 40 and to supply (or "inject") the drawn-in lubricant to the lubricant duct 42. The spindle 6 activates mechanically, by its advance and return movement, the pumping of lubricant.

The space requirement of the machine 2, in particular the space requirement of the lubricating system 12, is reduced, as is also the weight of the machine 2, which facilitates the handling thereof.

The lubricating system 12 is also simple and reliable.

Furthermore, the cost of manufacturing the machine 2 is low, the number of components being reduced.

The pumping operation is also carried out economically in terms of energy, the energy necessary for pumping being provided by the movement of the spindle 6 along its axis of translation.

In the example illustrated, the machine 2 is a drilling machine. In a variant, however, the tool 7 is a milling cutter or a boring tool with a milling or countersinking device.

In a variant, the piston is fixed in terms of rotation relative to the casing.

In yet another variant, one of the cylinder and the piston is fixedly joined to the spindle in terms of translation along its axis and is free in terms of rotation relative to the spindle. The said one of the piston and the cylinder is then preferably fixed in terms of rotation relative to the casing, the other of the piston and the cylinder also being fixed in terms of rotation relative to the casing.

Also in a variant, the piston is fixedly joined to the spindle 6 in terms of translation along its axis, the cylinder being fixed in terms of translation relative to the casing.

In yet another variant, the positive feed drive mechanism of the spindle is of any suitable type, even if the mechanism 10 described has the advantage of a reduced space requirement while at the same time being compatible with the lubricating system.

The invention claimed is:

1. Processing machine (2), of the type comprising:
    a casing (4);
    a tool-holder spindle (6) which extends along an axis (A) and which is to carry a machine tool (7);
    a positive feed drive mechanism (10) for the tool-holder spindle (6), which mechanism is suitable for driving the spindle (6) simultaneously in rotation about its axis (A) relative to the casing (4) and in translation along its axis (A) relative to the casing (4) in accordance with an advance or return movement; and
    a system (12) for lubricating the machine tool (7), comprising:
        a lubricant inlet (40);
        a lubricant duct (42) delimited by the spindle (6), the lubricant duct (42) opening out at an end (14) of the spindle (6) which is to carry the machine tool (7), in order to supply the machine tool (7) with lubricant; and
        a lubricant-admission module (44) connecting the lubricant inlet (40) to the said lubricant duct (42),
    characterized in that the lubricant-admission module (44) forms a lubricant pump drawing in the lubricant from the lubricant inlet (40) and supplying the lubricant duct (42) of the spindle (6) with the drawn-in lubricant, the advance and return of the spindle (6) along its axis (A) activating the pumping of lubricant by the admission module (44).

2. Processing machine (2) according to claim 1, wherein the admission module (44) has a configuration for supplying lubricant to the lubricant duct (42) of the spindle (6) and a configuration for the induction of lubricant from the lubricant inlet (40), the advance of the spindle (6) activating the admission module (44) in the supply configuration and the return of the spindle (6) activating the admission module (44) in the induction configuration.

3. Processing machine (2) according to claim 2, wherein the configuration for the induction of lubricant by the admission module (44) corresponds to a configuration for stopping the supply by the admission module (44) to the lubricant duct (42) of the spindle (6).

4. Processing machine (2) according to claim 1, wherein the admission module (44) comprises a piston (48) and a cylinder (49) which together define a pumping chamber (53), the pumping chamber (53) being connected to the lubricant inlet (40) and to the lubricant duct (42) of the spindle (6), the spindle (6) being connected for translation along its axis (A) to one of the piston (48) and the cylinder (49), the advance and the return of the spindle (6) along its axis (A) modifying the volume of the pumping chamber (53).

5. Processing machine (2) according to claim 4, wherein the other of the piston (48) and the cylinder (49) is fixed in terms of translation relative to the casing (4) along the axis (A) of the spindle.

6. Processing machine (2) according to claim 4, wherein the spindle (6) is connected for translation along its axis (A) to the cylinder (49).

7. Processing machine (2) according to claim 4, wherein the piston (48) delimits a filling duct (54) connected to the lubricant inlet (40) and leading into the pumping chamber (53), the piston (48) delimiting a supply duct (56) leading into the pumping chamber (53) and connected to the lubricant duct (42) of the spindle (6), the piston (48) comprising a filling valve (58) which is mobile between a position of closing the filling duct (54) and a position of opening the filling duct (54), and a supply valve (60) which is mobile between a position of closing the supply duct (56) and a position of opening the supply duct (56).

8. Processing machine (2) according to claim 7, wherein the admission module (44) has a configuration for supplying lubricant to the lubricant duct (42) of the spindle (6) and a configuration for the induction of lubricant from the lubricant inlet (40), the advance of the spindle (6) activating the admission module (44) in the supply configuration and the return of the spindle (6) activating the admission module (44) in the induction configuration, and wherein, in the induction configuration, the filling valve (58) is in its opening position while the supply valve (60) is in its closing position and wherein, in the supply configuration, the filling valve (58) is in its closing position while the supply valve (60) is in its opening position.

9. Processing machine (2) according to claim 8, wherein the filling valve (58) and the supply valve (60) are urged resiliently towards their closing position by a respective resilient biasing member (62, 64).

10. Processing machine (2) according to claim 9, wherein the force exerted on the filling valve (58) by the resilient biasing member (62) is smaller than the suction force exerted on the filling valve (58) by the lubricant present in the pumping chamber (53), during the return of the spindle (6) along its axis (A).

11. Processing machine (2) according to claim 9, wherein the force exerted on the supply valve (60) by the resilient biasing member (64) is smaller than the pressing force exerted on the supply valve (60) by the lubricant present in the pumping chamber (53), during the advance of the spindle (6) along its axis (A).

12. Processing machine (2) according to claim 1, wherein the admission module (44) is accommodated in the casing (4).

13. Processing machine (2) according to claim 1, comprising a lubricant reservoir (46) connected to the lubricant inlet (40) and preferably located outside the casing (4) of the machine (2).

14. Processing machine (2) according to claim 1, wherein the mechanism (10) for driving the spindle (6) comprises:
 a first member (20) for driving the spindle (6) in rotation about its axis (A) relative to the casing (4);
 a second member (24) for driving the spindle (6) in translation along its axis (A) relative to the casing (4), the second drive member (24) being screwed onto a threaded portion (26) of the spindle (6) so that the spindle (6) advances or returns in accordance with the relative rate of rotation between the first drive member (20) and the second drive member (24).

15. Method for processing a material by means of a processing machine (2), the processing machine being of the type comprising:
 a casing (4);
 a tool-holder spindle (6) which extends along an axis (A) and which is to carry a machine tool (7);
 a positive feed drive mechanism (10) for the tool-holder spindle (6), which mechanism is suitable for driving the spindle (6) simultaneously in rotation about its axis (A) relative to the casing (4) and in translation along its axis (A) relative to the casing (4) in accordance with an advance or return movement; and
 a system (12) for lubricating the machine tool (7), comprising:
  a lubricant inlet (40);
  a lubricant duct (42) delimited by the spindle (6), the lubricant duct (42) opening out at an end (14) of the spindle (6) which is to carry the machine tool (7), in order to supply the machine tool (7) with lubricant; and
  a lubricant-admission module (44) connecting the lubricant inlet (40) to the said lubricant duct (42),
 wherein the lubricant-admission module (44) forms a lubricant pump drawing in the lubricant from the lubricant inlet (40) and supplying the lubricant duct (42) of the spindle (6) with the drawn-in lubricant, the advance and return of the spindle (6) along its axis (A) activating the pumping of lubricant by the admission module (44),
 the method comprising a step for the automatic lubrication of the machine tool (7) by the processing machine (2), the lubricating step comprising a step of pumping lubricant by the alternating advance and return movement of the spindle (6).

* * * * *